(12) United States Patent
Shimoi et al.

(10) Patent No.: US 7,552,278 B2
(45) Date of Patent: Jun. 23, 2009

(54) DISK ARRAY ACCESS DYNAMIC CONTROL DEVICE AND METHOD

(75) Inventors: Hiroyuki Shimoi, Kawasaki (JP); Eiichi Yamanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 255 days.

(21) Appl. No.: 11/237,699

(22) Filed: Sep. 29, 2005

(65) Prior Publication Data

US 2006/0294303 A1 Dec. 28, 2006

(30) Foreign Application Priority Data

Jun. 24, 2005 (JP) ............................. 2005-185574

(51) Int. Cl.
*G06F 12/00* (2006.01)

(52) U.S. Cl. .................................... 711/114

(58) Field of Classification Search .................. 711/114
See application file for complete search history.

(56) References Cited

U.S. PATENT DOCUMENTS

| | | | | |
|---|---|---|---|---|
| 5,412,592 | A * | 5/1995 | Krishnamoorthy et al. | 365/49 |
| 5,680,521 | A * | 10/1997 | Pardo et al. | 358/1.13 |
| 5,720,028 | A * | 2/1998 | Matsumoto et al. | 714/9 |
| 5,761,526 | A | 6/1998 | Sakaura et al. | |
| 5,768,623 | A | 6/1998 | Judd et al. | |
| 6,622,252 | B1 * | 9/2003 | Klaassen et al. | 713/320 |
| 6,912,635 | B2 | 6/2005 | Patterson et al. | |
| 6,970,973 | B2 * | 11/2005 | Katsuragi et al. | 711/114 |
| 7,096,286 | B2 * | 8/2006 | Suzuki et al. | 710/74 |
| 7,181,578 | B1 * | 2/2007 | Guha et al. | 711/154 |
| 2002/0166005 | A1 | 11/2002 | Errico | |
| 2003/0210620 | A1 * | 11/2003 | Yamanaka | 369/44.32 |
| 2005/0172073 | A1 * | 8/2005 | Voigt et al. | 711/114 |
| 2005/0172097 | A1 * | 8/2005 | Voigt et al. | 711/170 |

FOREIGN PATENT DOCUMENTS

| | | |
|---|---|---|
| JP | 6-124175 | 6/1994 |
| JP | 8-63298 | 3/1996 |
| JP | 8-328759 | 12/1996 |
| JP | 9-81527 | 3/1997 |
| JP | 2002-116936 | 4/2002 |
| JP | 2002-140169 | 5/2002 |
| JP | 2002-533831 | 10/2002 |
| JP | 2004-5634 | 1/2004 |
| JP | 2004-46352 | 2/2004 |
| JP | 2004-102823 | 4/2004 |

OTHER PUBLICATIONS

Japanese Office Action issued on Jan. 6, 2009 in corresponding Japanese Patent Application 2005-185574.

* cited by examiner

*Primary Examiner*—Pierre-Michel Bataille
*Assistant Examiner*—John P Fishburn
(74) *Attorney, Agent, or Firm*—Staas & Halsey LLP

(57) ABSTRACT

In order to provide a disk array access dynamic control device and a method for improving the performance of a disk array device, the disk array access dynamic control device 1 comprises a composition information storage unit 3 for storing composition information, such as the combination information of disk devices constituting a RAID and the like, a responsible DA control unit 4 for assigning DAs according this composition information or the like and an access unit 6 for reading/writing data from/into a disk device group 2 according to the instruction of an information processing device 5.

6 Claims, 10 Drawing Sheets

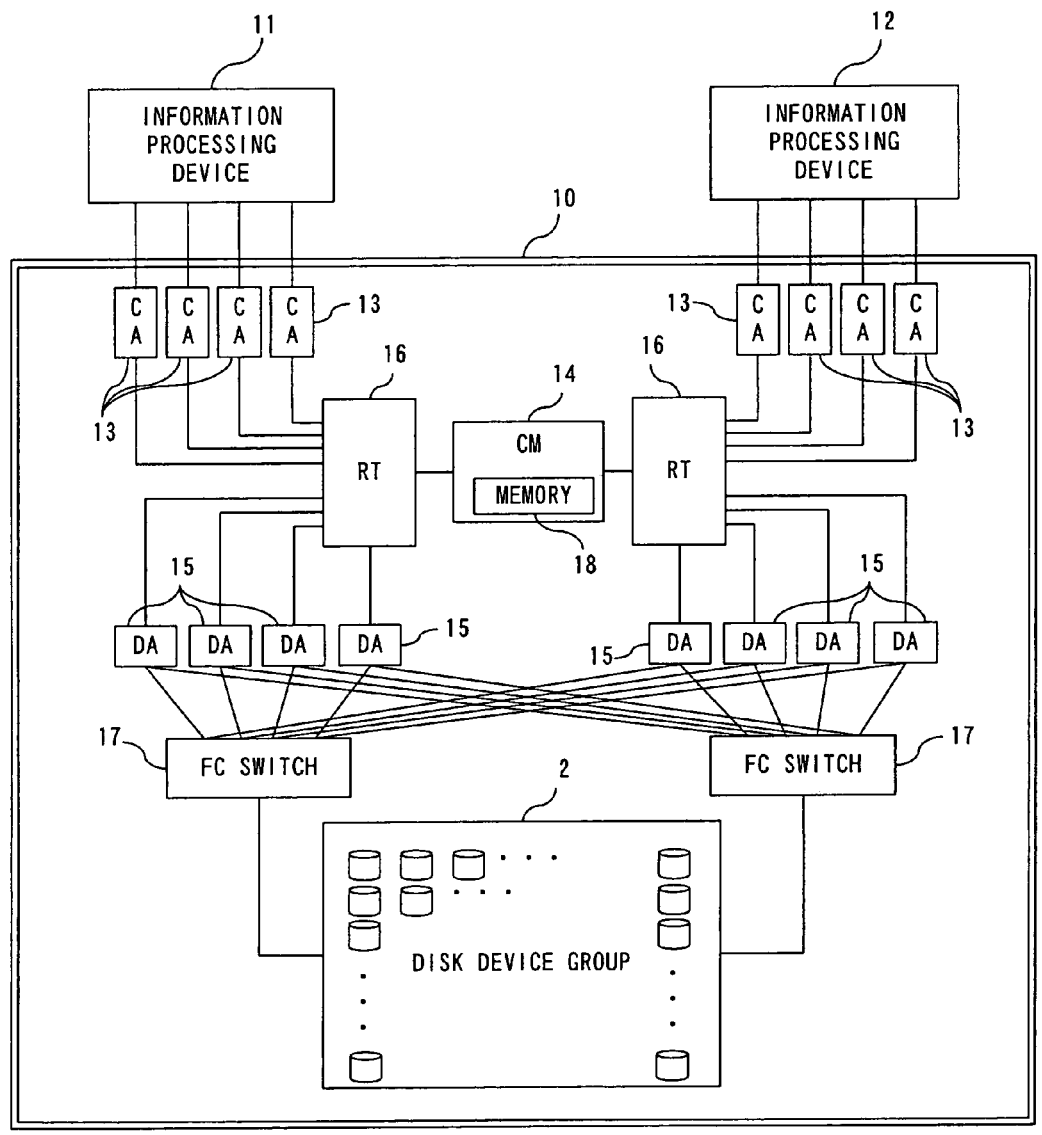
F I G. 3

| RAID NUMBER | RAID TYPE | SLOT NUMBER | DE NUMBER | DISK WEIGHT | RAID WEIGHT |
|---|---|---|---|---|---|
| 01 | RAID0+1 (4+4) | 08 | 00-07 | 0.75 | 6.0 (0.75×8) |
| 02 | RAID0+1 (4+4) | 07 | 00-07 | 0.75 | 6.0 (0.75×8) |
| 03 | RAID0+1 (4+4) | 06 | 00-07 | 0.75 | 6.0 (0.75×8) |
| 04 | RAID1 (1+1) | 05 | 06-07 | 0.75 | 1.5 (0.75×2) |
| 05 | RAID1 (1+1) | 04 | 06-07 | 0.75 | 1.5 (0.75×2) |
| 06 | RAID0+1 (3+3) | 03 | 02-07 | 0.75 | 4.5 (0.75×6) |
| 07 | RAID5 (3+1P) | 02 | 04-07 | 1.125 | 4.5 (1.125×4) |
| 08 | RAID5 (3+1P) | 01 | 04-07 | 1.125 | 4.5 (1.125×4) |
| 09 | RAID5 (3+1P) | 00 | 04-07 | 1.125 | 4.5 (1.125×4) |

FIG. 4

| DA NUMBER | DA PATH P#00 | | DA PATH P#01 | | DA WEIGHT |
|---|---|---|---|---|---|
| | RAID NUMBER | RAID WEIGHT | RAID NUMBER | RAID WEIGHT | |
| DA#00 | RAID#01 | 6.0 | RAID#05 | 1.5 | 9.0 |
| | | | RAID#04 | 1.5 | |
| DA#01 | RAID#02 | 6.0 | RAID#09 | 4.5 | 10.5 |
| DA#02 | RAID#03 | 6.0 | RAID#08 | 4.5 | 10.5 |
| DA#03 | RAID#06 | 4.5 | RAID#07 | 4.5 | 9.0 |
| DA#04 | RAID#07 | 4.5 | RAID#06 | 4.5 | 9.0 |
| DA#05 | RAID#08 | 4.5 | RAID#03 | 6.0 | 10.5 |
| DA#06 | RAID#09 | 4.5 | RAID#02 | 6.0 | 10.5 |
| DA#07 | RAID#05 | 1.5 | RAID#01 | 6.0 | 9.0 |
| | RAID#04 | 1.5 | | | |

22

F I G. 7

| RAID NUMBER | RAID TYPE | RESPONSIBLE DA | DA PATH |
|---|---|---|---|
| 01 | RAID0+1 (4+4) | DA#00 | P#00 |
| | | DA#07 | P#01 |
| 02 | RAID0+1 (4+4) | DA#01 | P#00 |
| | | DA#06 | P#01 |
| 03 | RAID0+1 (4+4) | DA#02 | P#00 |
| | | DA#05 | P#01 |
| 04 | RAID1 (1+1) | DA#07 | P#00 |
| | | DA#00 | P#01 |
| 05 | RAID1 (1+1) | DA#07 | P#00 |
| | | DA#00 | P#01 |
| 06 | RAID0+1 (3+3) | DA#03 | P#00 |
| | | DA#04 | P#01 |
| 07 | RAID5 (3+1P) | DA#04 | P#00 |
| | | DA#03 | P#01 |
| 08 | RAID5 (3+1P) | DA#05 | P#00 |
| | | DA#02 | P#01 |
| 09 | RAID5 (3+1P) | DA#06 | P#00 |
| | | DA#01 | P#01 |

FIG. 8

DISK ARRAY ACCESS DYNAMIC CONTROL DEVICE AND METHOD

BACKGROUND OF THE INVENTION

1. Field of the Invention

The present invention relates to a device for dynamically controlling an access to the disk array of a disk array device, constituting a plurality of disk arrays by combining the disk devices of a disk device group and a method thereof.

2. Description of the Related Art

Conventionally, in order to improve the performance, such as an access time, flexibility in composition, and the like, of a disk array device, a plurality of I/Fs (hereinafter called "device adapter (DA)") for accessing a disk device group is provided, and the disk device group is accessed via one of the DAs.

FIG. 1 shows the major units of the conventional disk array device.

The disk array device shown in FIG. 1 comprises a disk device group 90 composed of a plurality of disk devices, Das 91 and 92, which are I/Fs for accessing this disk device group 90 and a disk array controller 93 for controlling a data access between an information processing device 94 and the disk device group 90 and the entire array device.

The disk device group 90 shown in FIG. 1 is constituted by a plurality of print-wired boards with a plurality of disk devices. Hereinafter the print-wired board is called "slot" and its position is indicated by its "slot number". A unique logical number (hereinafter called "RAID number") is also assigned to each of redundant arrays of inexpensive/independent disks (RAID). Foe example, RAID number #00 is assigned to a disk device mounted on the print-wired board whose slot number is #00.

In this case, which DA takes charge of which RAID is generally determined uniquely by its slot number or a RAID number. For example, which DA that takes charge of which RAID is uniquely determined by whether the slot number or RAID number is odd or even.

Japanese Patent Application No. H06-124175 discloses a semiconductor disk device capable of realizing writing speed equivalent to or higher than that of a hard disk device by simultaneously implementing data transfer from the outside to buffer memory, data transfer from the buffer memory to flash memory and the erasure of the flash memory.

Japanese Patent Application No. 2002-116936 discloses a disk array device for equalizing a load due to the read requests of a plurality of HDDs and improving the response performance of a disk array device.

However, in the above-described method, unless disk devices must be consecutively mounted on the disk device mounting slots from one end to the other, there will be unbalance among RAIDs taken charge of by DAs and unbalance among the loads of the DAs. For example, disk devices are mounted every another slot, loads are charged only on DAs with odd (or even) slot numbers and no load is charged on the other slot numbers. Therefore, only performance for one DA can be effectively used, which is a problem.

SUMMARY OF THE INVENTION

It is an object of the present invention to provide a disk array access dynamic control device for improving the performance of a disk array device by distributing the loads of I/Fs accessing a disk device group in order to solve the above-described problem and a method thereof.

In order to solve the above-described problem, in a disk array device constituting a plurality of disk arrays by combining the disk devices of a disk device group and having a plurality of device adapters which is an interface for accessing the disk devices, the disk array access dynamic control device of the present invention comprises a composition information storage unit for storing the combination information of the disk devices constituting the disk array and disk weight indicating the average times of accesses to the disk devices constituting the disk array, a responsible-device adapter control unit for allocating the disk array to a responsible device adapter in such a way that the loads of the device adapters accessing a predetermined disk array become uniform, based on the combination information and disk weight, and an access unit for accessing the disk devices constituting the disk array via the responsible device adapter.

According to the present invention, the responsible-device adapter control unit refers to the composition information storage unit and obtains the combination information of disk devices constituting a disk array and disk weight indicating the average times of accesses to the disk devices constituting the disk array. Then, since the responsible-device adapter control unit assigns the disk array to a responsible device adapter in such a way that the loads of responsible device adapters become uniform, based on the combination information and disk weight, the loads of device adapters accessing a disk device group can be distributed.

As a result, the performance of the disk array device (such as the speed of a reading/writing process) can be improved.

As described above, according to the present invention, a disk array access dynamic control device and a method for improving the performance of a disk array device can be provided by distributing the loads of I/Fs accessing a disk device group.

BRIEF DESCRIPTION OF THE DRAWINGS

FIG. 3 shows an example of the detailed configuration of the disk array device in one preferred embodiment of the present invention.

FIG. 4 shows an example of composition information used by the disk array device of this preferred embodiment.

FIG. 7 shows an example of a responsible-DA assignment table generated by the process of the disk array access dynamic control device shown in FIG. 6.

FIG. 8 shows an example of a RAID assignment table generated by the process of the disk array access dynamic control device shown in FIG. 6.

DESCRIPTION OF THE PREFERRED EMBODIMENTS

The preferred embodiments of the present invention are described below with reference to FIGS. 2 through 10. A RAID used in the following description means a disk array. Therefore, RAID weight indicates disk array weight. And a RAID weight calculation unit indicates a disk array weight calculation unit.

Figure 1:
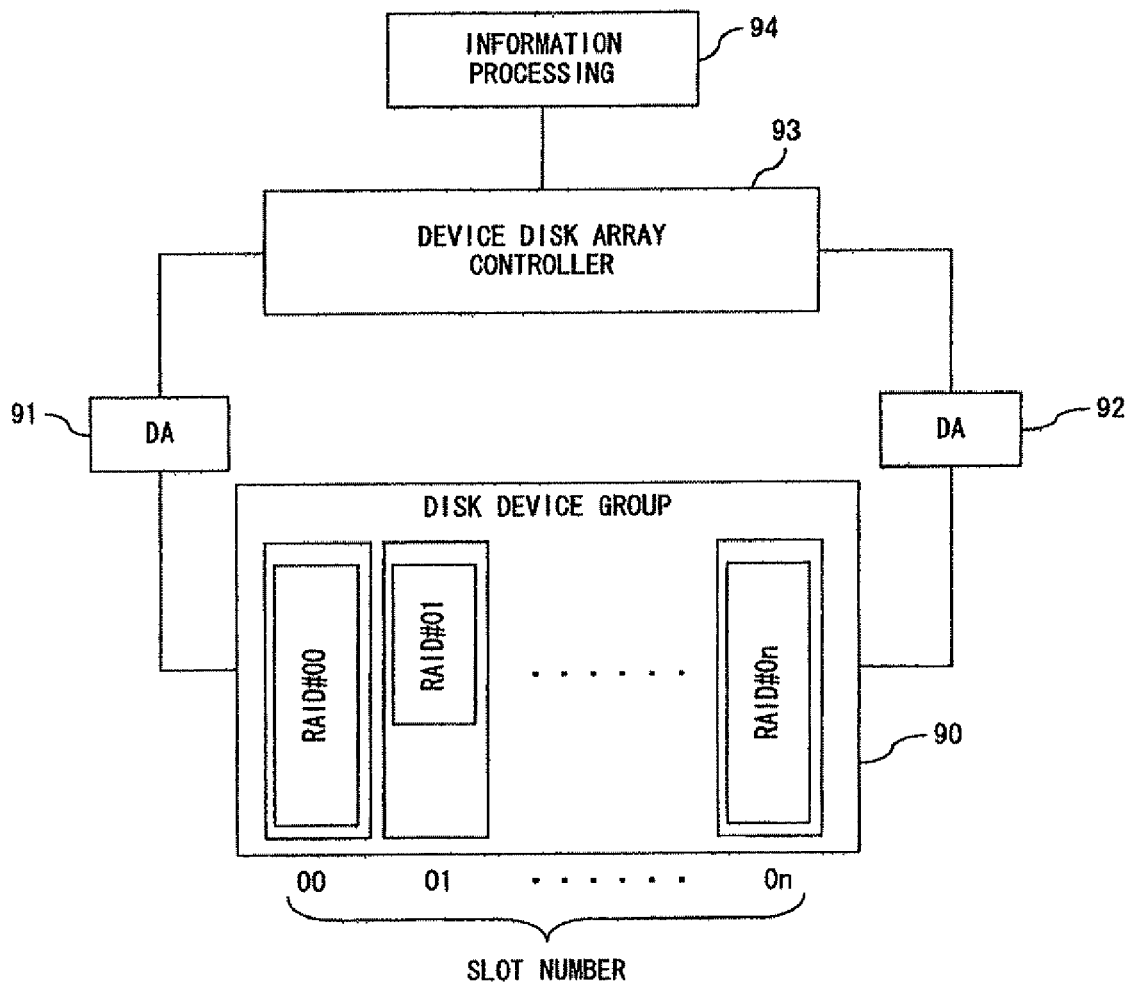
FIG. 1 shows the major units of the conventional disk array device.
Figure 2:
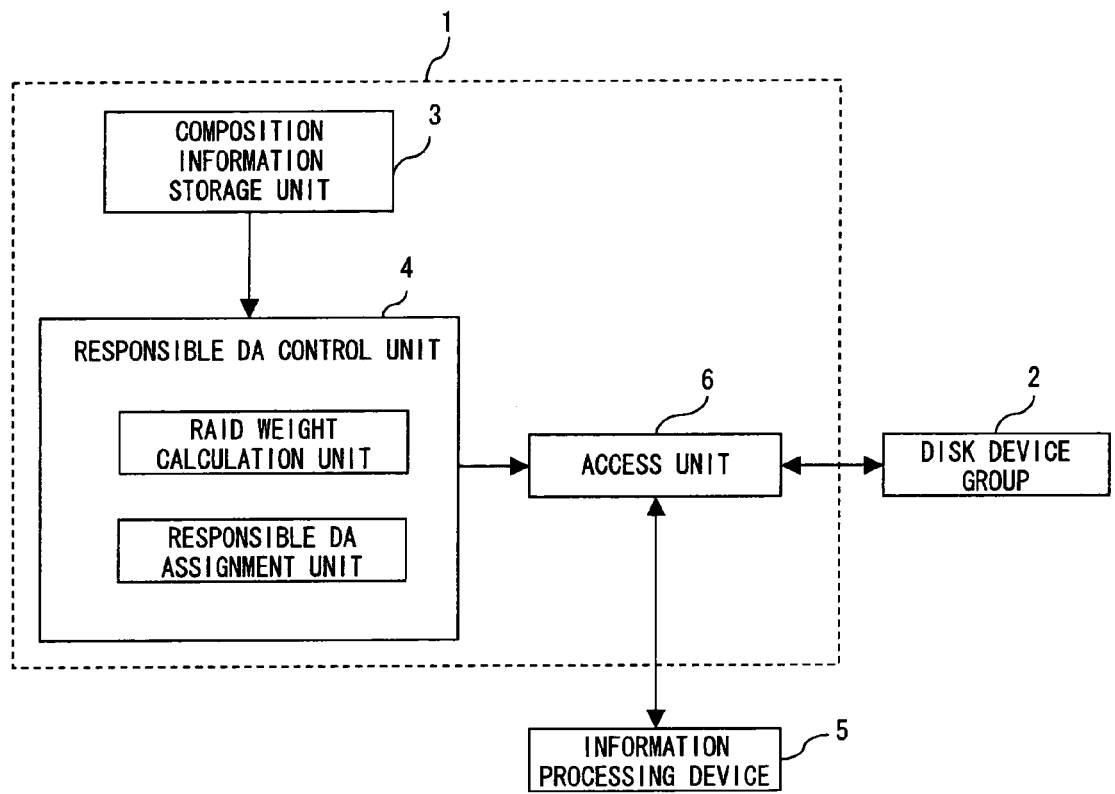
FIG. 2 shows the basic functional configuration of the present invention.

FIG. 2 shows the basic functional configuration of the present invention.

A disk array access dynamic control device 1 comprises a composition information storage unit 3 for storing composition information, such as the combination information of the disk devices constituting a RAID in a disk device group 2, a responsible DA control unit 4 for allocating DAs, being interfaces for accessing each RAID according to this composition information or the like, and an access unit 6 for reading/writing data from/into the disk device group 2 (hereinafter calling this process "access") according to the instruction of an information processing device 5.

The disk device group 2 is composed of a plurality of disk devices, and generates a plurality of RAIDs according to the composition information stored in the composition information storage unit.

The composition information storage unit 3 stores an average times of access (hereinafter called "disk weight") to each disk device constituting a RAID, from a DA in addition to the combination information of disk devices constituting the RAID in the disk device group 2.

The responsible DA control unit 4 refers to the composition information stored in the composition information storage unit 3 and obtains the disk weight. Then, the responsible DA control unit 4 controls the assignment of RAIDs to be taken charge of, to each DA in such a way that the loads of the DAs (device adapter weight, hereinafter called "DA weight") may become uniform, according to this disk weight. In the following description, a DA that takes charge of accesses to one or a plurality of predetermined RAIDs is called "responsible DA".

The access unit 6 accesses the disk device group 2 via a responsible DA assigned by the responsible DA control unit 4, according to an instruction from the information processing device 5.

The disk array device comprises the disk array access dynamic control device 1 and disk device group 2 which are described above.

The responsible DA control unit 4 of the disk array access dynamic control device 1 shown in FIG. 2 further comprises a RAID weight calculation unit for calculating an average times of accesses of a DA to one RAID (hereinafter called "RAID weight") and a responsible DA assignment unit for calculating an average times of accesses of a responsible DA to one or a plurality of RAIDs to take charge of (hereinafter called "DA weight") and assigning RAIDs to the responsible DA in such a way that all DA weights may become uniform.

Therefore, the responsible DA control unit 4 obtains disk weight by referring to the composition information storage unit 3 and calculates the RAID weight of each RAID which is generated in the disk device group 2 according to this disk weight.

Furthermore, DA weight is calculated based on the RAID weight, and also assigns RAIDs to the responsible DA in such a way that all DA weights may become uniform.

Thus access loads from each DA to the disk device group 2 can be uniformly distributed, and the performance of the disk array device (particularly, access performance) can be improved.

The composition information storage unit 3 described above can be realized by memory 18 shown in FIG. 3. The memory 18 can be made of volatile memory (such as a RAM), non-volatile memory (such as an EEPROM) or the like.

The responsible DA control unit 4 can be realized by a CM 14. The access unit 6 can be realized by CAs 13 and a CM 14, DAs 15, an RTs 16 and an FC switches 17.

FIG. 3 shows an example of the detailed configuration of the disk array device in one preferred embodiment of the present invention.

A disk array device 10 shown in FIG. 3 comprises channel adapters (CA) 13, being I/Fs with the I/O devices of an information processing devices 11 and 12, which are not shown FIG. 3, a controller module (CM) 14 for controlling the disk array device 10, DA 15, being I/Fs for accessing a disk device group 2 from the CM 14, routers (RT) 16, being I/Fs with the CA 13, CM 14 and DA 15, fiber channel (FC) switches 17 for variably connecting a path between each DA 15 and the disk device group 2 and the disk device group 2 composed of a plurality of disk devices.

Each CA 13 comprises an I/F with the information processing device 11 or 12. For the CA 13 of this preferred embodiment, one for FC is used. However, the CA 13 is not limited to this, and for example, one for iSCSI can also be used.

The CM 14 controls the disk array device 10. More particularly, the CM 14 controls data transfer between the CM 14 and the disk device group 2 by controlling the DA 15. The CM 14 further comprises memory 18, which stores a program needed to control the disk array device 10, composition information 20, and data to be written into or read from the disk device group 2.

The DA 15 is an I/F with the disk device group 2. When writing data into a RAID constituting the RAID 5, the DA 15 generates a data stripe. The RT 16 is a multiplexer for connecting the CA 13, CM 14 and DA 15 with each other by a PCI path.

The DA 15 and the disk device group 2 are connected via the FC switch 17. They are connected in so-called fabric type.

In the above-described configuration, if for example, a reading process is performed, the CM 14 transmits data to the information processing device 11 via the RT 16 and CA 13 according to an instruction from the information processing device 11 if there is corresponding data on the memory 18.

If there is no corresponding data on the memory 18, the CM 14 reads corresponding data from the disk device group 2 via the FC switch 17, DA 15 and RT 16 and stores the data in the memory 18. Simultaneously, the CM 14 transmits the data to the information processing device 11 via the RT 16 and CA 13.

When a writing process is performed, the data is transmitted from the information processing device 11 to the CM 14 via the CA 13 and RT 16, and is stored in the memory 18. Then, data is read from the disk device group 2 via the FC switch 17, DA 15 and RT 16, as requested, and is written into the disk device group 2 via the RT 16, DA 15 and FC switch 17 by a bandwidth writing process.

Although the same number of data buses between the DA 15 and the FC switch 17 and between the disk device group 2 and the FC switch 17 as device enclosures (DE) exist, the data buses are typically shown in FIG. 3.

Since the disk array device of this preferred embodiment is provided with the maximum of eight DEs, each DA 15 has eight data buses, and is connected to each FC switch by four data buses. Each FC switch 17 is connected to the disk device group 2 by eight data buses.

The number of each of the information processing device 11 or 12, CA 13, CM 14, DA 15, RT 16, FC switch 17 and memory 18 are not limited to those shown in FIG. 3, and can be any number, as requested.

FIG. 4 shows an example of composition information 20 used by the disk array device 10 of this preferred embodiment.

The composition information 20 shown in FIG. 4 stores a RAID number, which is a logical number uniquely assigned to a RAID constituting the disk device group 2, a RAID type, the slot number and DE number of each RAID, which define its location in the disk device group 2 composed of RAIDs, the disk weight of a disk device constituting each RAID and RAID weight, for each RAID number.

The parenthesized description of the RAID type indicates the disk device composition of each RAID. For example, RAID with RAID number #01 mirrors four disk devices and total eight disk devices constitute RAID 0+1. RAID with RAID number #07 constitutes RAID 5 in which of four disk devices, an arbitrary one is used for parity data.

RAID 1 indicates a disk array which always writes the same contents in two disks. RAID0+1 indicates a disk array obtained by combining DAID0 with RAID1, which divides data into blocks and distributes/records the data to/on a plurality of disks. RAID 5 indicates a disk array which generates parity data for the striping data of RAID0 and distributes/records the parity data to/on an arbitrary disk.

The disk weight of a disk device constituting each RAID can be calculated as follows. The RAID type is divided into two groups; one group of RAID0+1 and RAID1 (hereinafter called "mirror system RAID"), and the other group of RAID5, and is described. In the following calculation of each weight, it is assumed for convenience' sake that the average times of accesses in the case where a DA accesses all disk devices constituting a RAID is 1.0 (reference).

In the Case where Raid Type is Mirror System Raid

When reading, the average times of accesses to one disk device, viewed from a DA become 0.5 (=1*½) since either a primary disk or secondary disk is accessed.

When writing, the average times of accesses to one disk device, viewed from a DA become 1.0 since the primary and secondary disks are simultaneously accessed.

If it is assumed that the ratio between reading and writing processes is 1:1, the average times of accesses to one disk device (disk weight), viewed from a DA become 0.75 (=0.5*0.5+1.0*0.5).

Therefore, since, for example, RAID with RAID number #01, shown in FIG. 4 constitutes RAID0+1(4+4) using eight disk devices, RAID weight becomes 6.0 (=0.75*8).

(2) In the Case where Raid Type is Raid5

RAID5(3+1P) is described below for convenience' sake.

When reading, the average times of accesses to one disk device, viewed from a DA become 0.75 (=1.0*¾) since a disk device storing data (disk device other than one used to store parity data) is accessed unless there is no failure in the disk device.

When writing, if a DA completes the data stripe of the RAID5, a bandwidth writing process is performed and a writing process is simultaneously applied to all disk devices. Therefore, the average times of accesses to one disk device, viewed from a DA become 1.0.

If a DA does not complete the data stripe of the RAID5, specifically if the size of the data stripe is below that of the predetermined data stripe size, the bandwidth writing process is performed after the data stripe is completed. In this case, the reading process of reading data from a disk device (all devices containing a device for parity data) accompanies. Therefore, if the size of the data stripe is below that of the predetermined data stripe size, the average times of accesses to one disk device, viewed from a DA are the sum of the average times of accesses 1.0 of one disk device, viewed from a DA when reading and the average times of accesses 1.0 of one disk device, viewed from a DA when writing and become 2.0.

If it is assumed that the ratio between reading and writing processes is 1:1 and the establishment ratio of bandwidth writing is 50%, the average times of accesses to one disk device (disk weight), viewed from a DA are 1.125 (=0.75*0.5+(1.0+2.0)*0.5*0.5) since they are 0.75*0.5 when reading and (1.0+2.0)*0.5*0.5 when writing.

Thus, since, for example, RAID with RAID number #07, shown in FIG. 4 constitutes RAID5 using four disk devices, RAID weight becomes 4.5 (=1.125*4).

Although in the above description, disk devices constituting each RAID all have the same performance (such as the same rotation speed of a magnetic disk), RAID weight can also be calculated according to the performance of each disk device constituting the RAID.

For example, it is assumed that the reference rotation speed of a disk device is 10,000 rotations/minute. If the rotation speed of a disk device constituting RAID with RAID number #01 is 15,000 rotations/minute, performance of 1.5 times the reference rotation speed can be obtained. Therefore, the RAID weight of RAID with RAID number #01 can also be calculated 9.0 (=6.0*1.5).

Similarly, if the rotation speed of a disk device constituting RAID with RAID number #07 is 15,000 rotations/minute, performance of 1.5 times the reference rotation speed can also be obtained. Therefore, the RAID weight of RAID with RAID number#07 can also be calculated 6.75 (=4.5*1.5).

Figure 5:
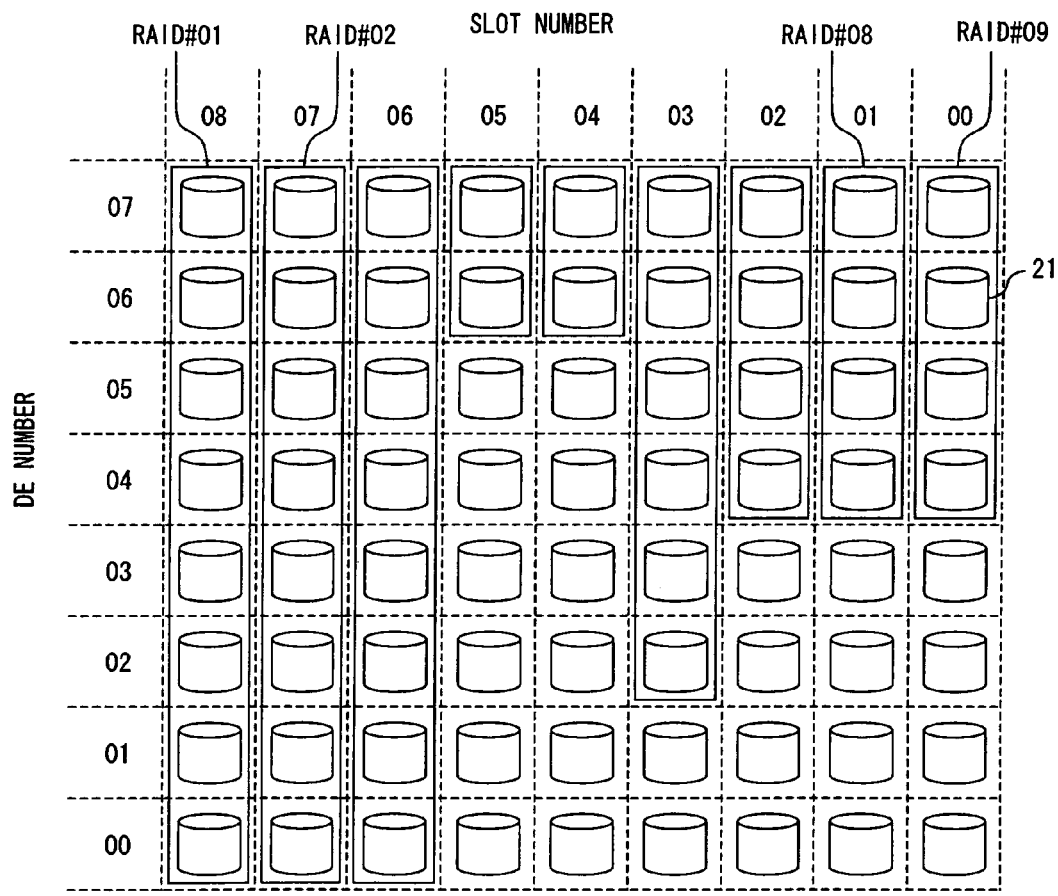
FIG. 5 shows an example of the disk device group configured according to the composition information shown in FIG. 4.

FIG. 5 shows an example of the disk device group 2 configured according to the composition information 20 shown in FIG. 4.

The disk device group 2 shown in FIG. 5 is configured by mounting a print-wired board with eight disk devices in each of slots with slot numbers #00-#08. A DE represents a slot for disk device.

Therefore, a slot number indicates the mounting position of the print-wired board with eight disk devices, and a DE number indicates the mounting position of a disk device of each slot.

In the disk device group 2 shown in FIG. 5, RAIDs are formed according to the composition information 20 shown in FIG. 4. For example, in the DE number #00-07 of slot number #08, RAID (RAID number #01) of RAID0+1 (4+4) is formed. In the DE number #04-07 of slot number #00, RAID (RAID number #09) of RAID5(3+1) is formed.

Each disk device 21 constituting the disk device group 2 shown in FIG. 5 is compatible with a dual port in which two interfaces can be simultaneously used. For example, a HDD in which two serial interfaces can be simultaneously used is used.

Therefore, two paths exist for accessing the same disk device. Hereinafter, these paths are called "DA paths", and are distinguished by DA path numbers "P#00" and "P#01".

The detailed process of the disk array access dynamic control device 1 in the disk array device 10 with the above-described configuration is described below with reference to FIGS. 6 through 10.

Figure 6:
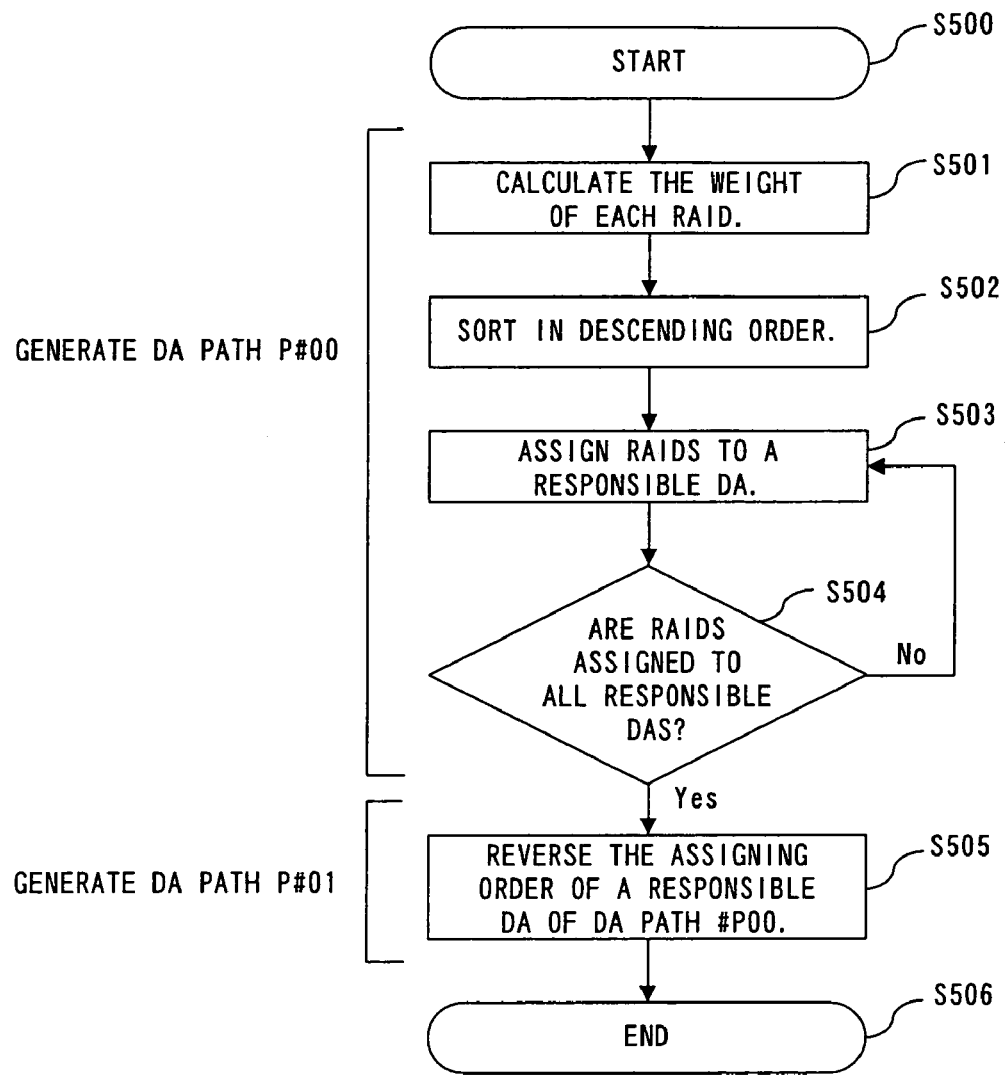
FIG. 6 is a flowchart showing the process of the disk array access dynamic control device allocating a RAID to be taken charge of to each DA.

FIG. 6 is a flowchart showing the process of the disk array access dynamic control device 1 assigning a RAID to each responsible DA. Although the process to be described below can be realized by a CPU provided for the CM 14 shown in FIG. 3 reading a program stored, for example, in the memory 18 and executing the instruction of the program, the description is made using the disk array access dynamic control device 1 as the subject of the process, for convenience' sake.

FIG. 7 shows an example of a responsible-DA assignment table 22 generated by the process of the disk array access dynamic control device 1 shown in FIG. 6. This responsible DA assignment table 22 shows the relationship between a responsible DA, RAIDs in DA paths P#00 and #P01 to be taken charge of by the responsible DA and DA weight.

The DA weight is calculated as the sum of RAID weights to be taken charge of by each responsible DA. Then, the responsible-DA assignment table 22 is generated in such a way DA weights may become uniform, by the following process.

Firstly, in step S500 shown in FIG. 6, the disk array access dynamic control device 1 reads the composition information 20 stored in the memory 18, and the process proceeds to step S501.

In step S501, the disk array access dynamic control device 1 calculates the RAID weight of each RAID (for example, each of RAID numbers #01-09 shown in FIG. 4). Since the detailed calculation method of RAID weight has already described with reference to FIG. 4, it is omitted here. When the RAID weight calculation of each RAID is completed, the process proceeds to step S502.

In step S502, the disk array access dynamic control device 1 sorts the calculated RAID weights in descending order, and furthermore, in step S503, it sequentially assigns RAIDs to each DA.

For example, as shown in DA path P#00 of FIG. 7, RAID weight is assigned to DA#00, DA#01, DA#02, . . . , DA#7 in descending order, specifically, in the order of RAID#00 (RAID weight: 6.0), RAID#01 (RAID weight: 6.0), RAID#02 (RAID weight: 6.0), RAID#06 (RAID weight: 4.5), . . . , RAID#04 (RAID weight: 1.5).

Then, when RAID assignment to DA#00-07 is completed once, the process proceeds to step S504.

In step S504, the disk array access dynamic control device 1 checks whether all RAIDs are assigned to each responsible DA. If the assignment of all RAIDs is completed, the process proceeds to step S505.

If the assignment of all RAIDs is not completed, the process returns to step S503, and RAIDs are assigned to each DA in the order the reversal of the process previously performed in step S503. For example, as shown in DA path P#00 of FIG. 7, RAID weight is assigned to DA#07, DA#06, DA#05, . . . , DA#00 in descending order, specifically RAID#05 (RAID weight: 1.5) is assigned.

By the processes in steps S501 through S504, described above, the process of assigning RAIDs to the responsible DA of DA path P#00 is completed.

In step S505, the disk array access dynamic control device 1 generates a responsible DA assignment table 22 for DA path P#01 by reversing the ascending/descending order of the DA numbers for DA path P#00 generated in steps S501 through S504.

By the above-described process, as shown in FIG. 7, RAID#01, RAID#02, RAID#03, RAID#06, . . . , RAID#04 and RAID#05 are assigned to DA#00, DA#01, DA#02, DA#03, . . . , DA#07 in DA path P#00 and DA#07, DA#06, DA#05, DA#04, . . . , DA#00 in DA path P#01.

The DA weights of the responsible DA assignment table 22 generated by the above-described process are distributed between 9.0 and 10.5. However, since the average of all RAID weights shown in FIG. 4 is 4.3 (=6.0+6.0+1.5+ . . . +4.5)/9), the mean value of the DA weights becomes 8.6 (=4.6*2) taking into consideration DA paths P#00 and P#01. Thus, the DA weights become uniform with a value close to the mean value.

Then, in step S505, the disk array access dynamic control device 1 generates a responsible DA assignment table 23 shown in FIG. 8 from the responsible DA assignment table 22 shown in FIG. 7 and stores the table in the memory 18. Then, the process proceeds to step S506 and terminates.

The RAID assignment table 23 shown in FIG. 8 shows the relationship between each RAID, responsible DA and DA path.

For example, for access to RAID number #01, DA#00 (P#00) and DA#07 (P#01) are used as responsible DAs. For access to RAID number #07, DA#03 (P#01) and DA#04 (P#00) are used as responsible DAs.

Therefore, the CM 14 (access unit 6) refers to the RAID assignment table 23 stored in the memory 18 and obtains a responsible DA of a RAID to be accessed and a DA path and accesses the RAID.

The respective accesses to a mirror system RAID and RAID5 made according to the RAID assignment table 23 shown in FIG. 8 are described below.

Figure 9:
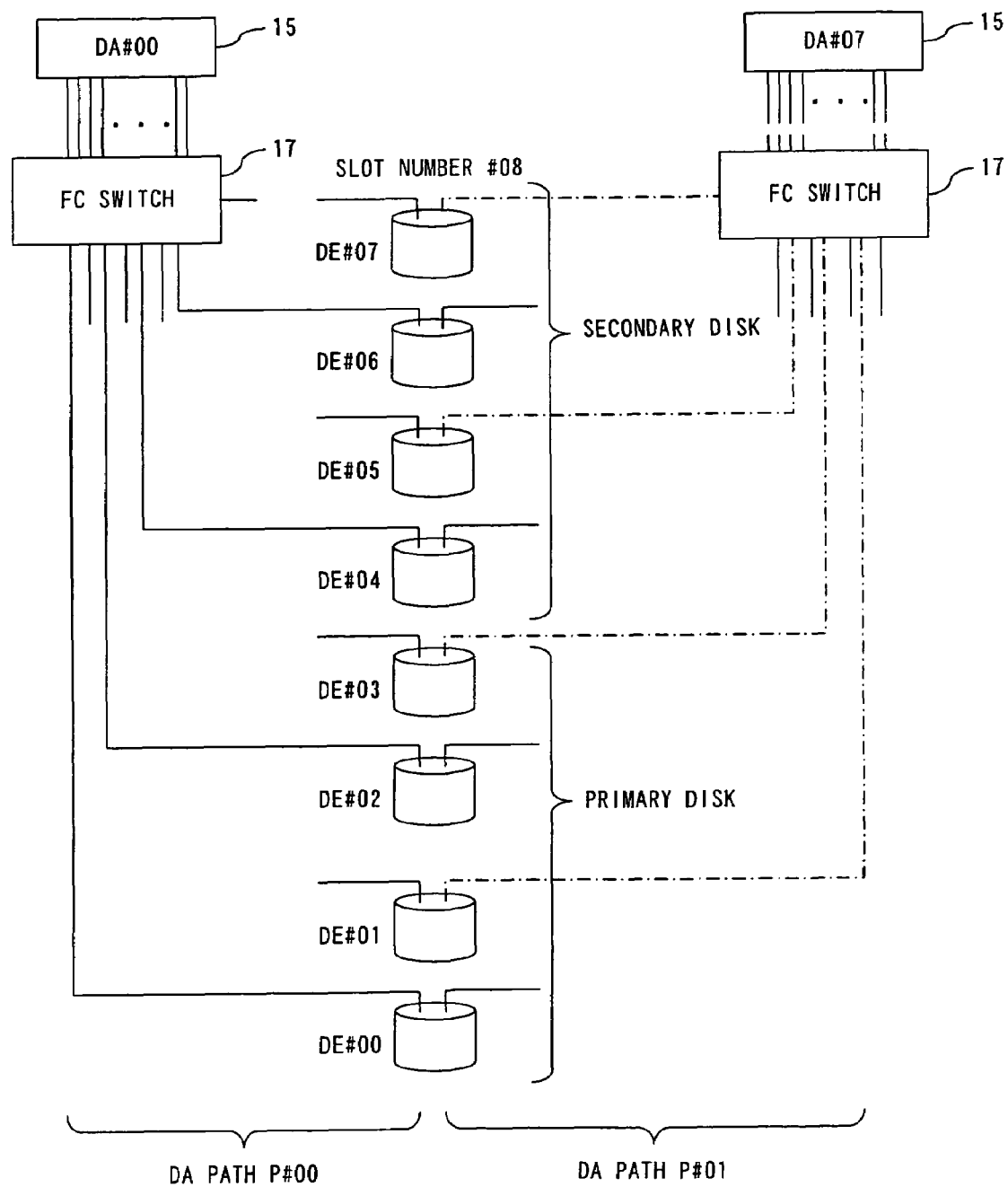
FIG. 9 shows the case of accessing a mirror system RAID according to the RAID assignment table shown in FIG. 8.

FIG. 9 shows the case of accessing RAID number#01 according to the RAID assignment table 23 shown in FIG. 8 as an example of accessing a mirror system RAID.

RAID with RAID number #01 shown in FIG. 9 is the RAID of RAID0+1 (4+4) duplicated by a primary disk with DE#00-03 and a secondary disk with DE#04-07.

Since each disk device is compatible with a dual port, it has DA paths P#00 and P#01 for left and right FC switches, respectively. Although all disk devices are physically connected to the left and right FC switches 17, FIG. 9 shows only lines connecting a responsible DA and a disk device to enable them to communicate with each other according to the RAID assignment table 23 shown in FIG. 8 are shown.

Then, disk devices connected to DA#00 to enable them to communicate with each other are indicated by solid lines, and disk devices connected to DA#07 to enable them to communicate with each other are indicated by one-point broken lines.

As shown in FIG. 9, when accessing a mirror system RAID, (1) if its slot number is even and also if its DA number is even, DA path #00 is used. (2) If its slot number is even and also if its DA number is odd, DA path #01 is used.

(3) If its slot number is odd and also if its DA number is even, DA path #01 is used, which is not shown in FIG. 9. (4) If its slot number is odd and also if its DA number is odd, DA path #00 is used.

Figure 10:
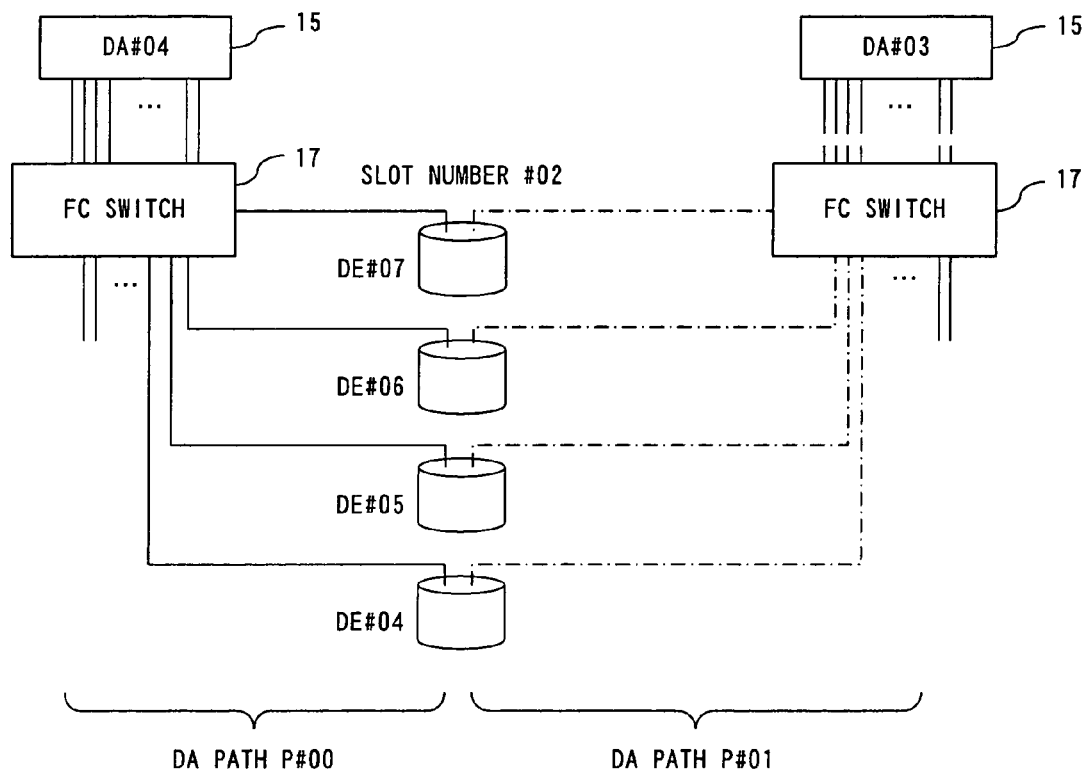
FIG. 10 shows the case of accessing a RAID 5 according to the RAID assignment table shown in FIG. 8.

In FIG. 10, RAID number #07 is accessed according to the RAID assignment table 23 shown in FIG. 8 as an example of accessing RAID5.

RAID with RAID number #01 shown in FIG. 10 is RAID of RAID5(3+1P) composed of four disk devices with DE#04-07.

Since each disk device shown in FIG. 10 is also compatible with a dual port, it has DA paths P#00 and #PO1 for the left and right FC switches 17, respectively. Although all disk devices are physically connected to the left and right FC switches 17, in FIG. 10 lines connecting a responsible DA and a disk device to enable them to communicate with each other according to the RAID assignment table 23 shown in FIG. 8 are shown.

Then, disk devices connected to DA#04 to enable them to communicate with each other are indicated by solid lines, and disk devices connected to DA#03 to enable them to communicate with each other are indicated by one-point broken lines.

When accessing RAID5, (1) if an address smaller than a predetermined logical block address (LBA) is accessed, DA path #00 is used. (2) If an address larger than a predetermined logical block address (LBA) is accessed, DA path #01 is used.

As the predetermined logical block address, a half or a third of the maximum logical block address can be set beforehand, as requested.

By the above-described process, tuning can be automatically performed in such a way to uniformly balance the loads (DA weight) of responsible DAs of each RAID. As a result, access performance to the disk device group 2 can be improved.

Since there in no need to assign each RAID to each responsible DA according to a slot number or a RAID number (for example, whether a slot is even or odd), a RAID number can be assigned regardless of the composition of disk devices and RAIDs in the disk device group 2.

What is claimed is:

1. A disk array access dynamic control method for enabling a disk array device which comprises a plurality of disk arrays obtained by combining disk devices of a disk device group and a plurality of device adapters, being interfaces for accessing the disk devices to execute a process, said process comprising:
    referring to a composition information storage unit for storing RAID type information of the disk arrays and disk weight indicating an average number of accesses from the device adaptor corresponding to the RAID type information when an instruction is issued from an information processing device to each disk device included in the respective disk arrays and obtaining disk weight;
    reassigning of the disk arrays to respective responsible device adapters in such a way that respective loads of the responsible device adapters accessing predetermined disk arrays can become uniform, according to the disk weight; and
    accessing a disk device included in the disk arrays via the responsible device adapter;
    wherein the reassigning of the disk arrays sorts the disk array weights in descending order and assigns RAIDs corresponding to the sorted disk array weights to each DA alternately in a first order and in a second order, being an order the reversal of the first.

2. The disk array access dynamic control method of claim 1,
    wherein if one of the disk arrays is a mirror system RAID of RAID0+1 or RAID1, the reassigning of the disk arrays assigns different device adapters as responsible device adapters which access mutually adjacent disk devices included in the one disk array.

3. The disk array access dynamic control method of claim 1,
    wherein if one of the disk arrays is RAID 5, according to a logical block address of the one disk array to be accessed, the reassigning of the disk arrays assigns a different device adapter as a responsible device adapter which access a disk device storing data at the logical block.

4. A disk array access dynamic control device in a disk array device which comprises a plurality of disk arrays obtained by combining disk devices of a disk device group and a plurality of device adapters, being interfaces for accessing the disk devices, comprising:
    composition information storage means for storing RAID type information of the disk arrays and disk weight indicating an average number of accesses from the device adaptor corresponding to the RAID type information when an instruction is issued from an information processing device to each disk device included in the respective disk arrays;
    responsible device adapter control means for reassigning of the disk arrays to respective responsible device adapters in such a way that respective loads of the responsible device adapters accessing predetermined disk arrays can become uniform, according to the disk weight; and
    access means for accessing a disk device included in the disk arrays via the responsible device adapter.

5. The disk array access dynamic control device of claim 4, wherein if one of the disk arrays is a mirror system RAID of RAID0+1 or RAID 1, the responsible device adapter control means assigns different device adapters as responsible device adapters which access mutually adjacent disk devices included in the one disk array.

6. The disk array access dynamic control of claim 4, wherein if one of the disk arrays is RAID 5, according to a logical block address of the disk array to be accessed, the responsible device adapter control means assigns a different device adapter as a responsible device adapter which access a disk device storing data at the logical block.

* * * * *